UNITED STATES PATENT OFFICE.

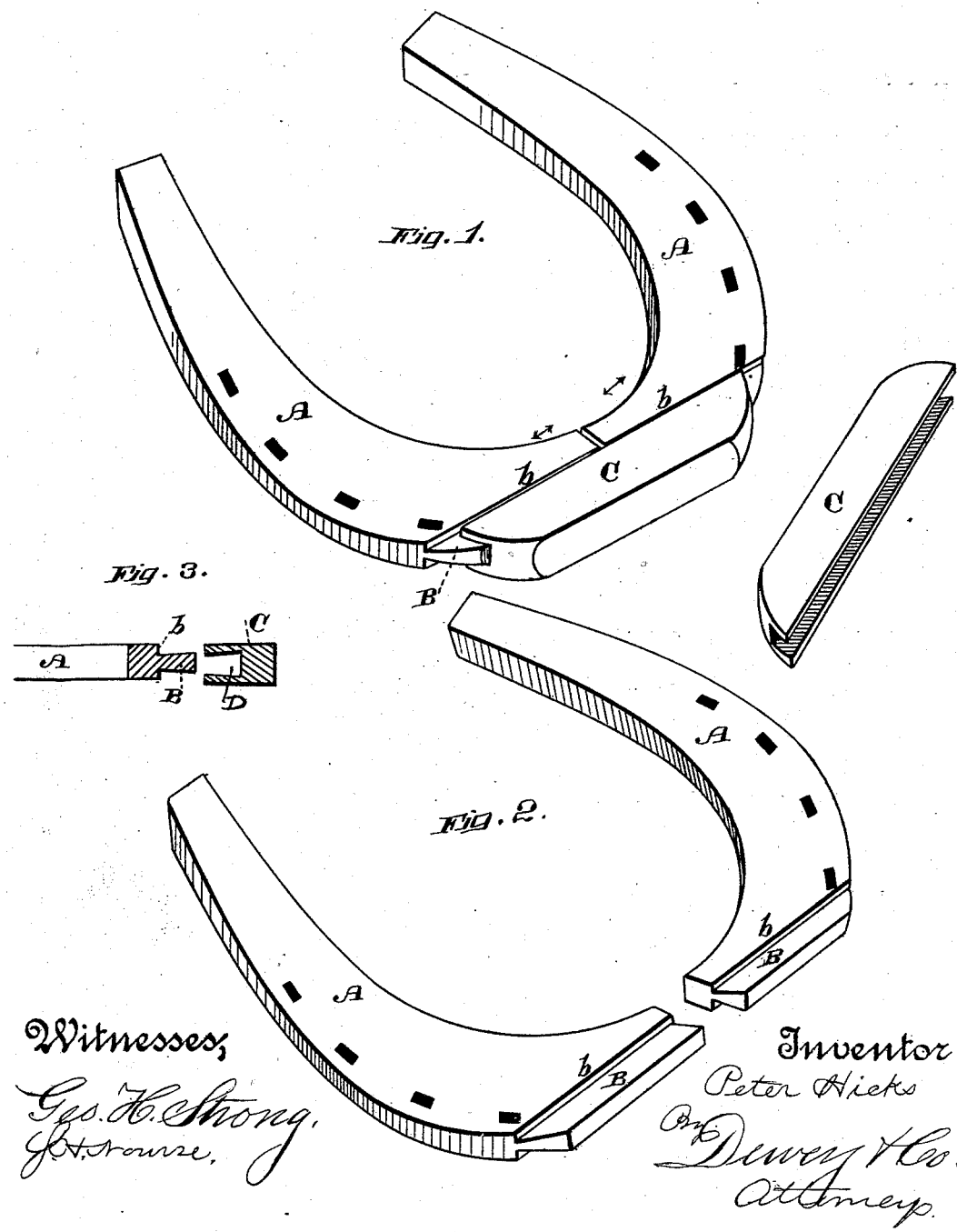

PETER HICKS, OF NAPA, CALIFORNIA.

ADJUSTABLE HORSESHOE.

SPECIFICATION forming part of Letters Patent No. 279,758, dated June 19, 1883.

Application filed November 4, 1882. (No model.)

*To all whom it may concern:*

Be it known that I, PETER HICKS, of the city and county of Napa, State of California, have invented an Improved Adjustable Horseshoe; and I hereby declare the following to be a full, clear, and exact description thereof.

My invention relates to certain improvements in horseshoes, by which I am enabled to so adjust them to the hoof as to allow the latter perfect freedom to expand both at the front and rear.

It consists of two curved bars fitting the sides of the hoof and meeting at the front. These bars are made straight or flat across the front edge, and may have a dovetailed groove or projection across their front edges to receive a transverse bar, which is correspondingly tongued or slotted to fit the front of the side plates as one, while it allows them to separate sidewise to accommodate the expansion of the foot.

Referring to the accompanying drawings for a more complete explanation of my invention, Figure 1 is a view of my shoe complete. Fig. 2 is a view of the side plates and front transverse bar separated. Fig. 3 is a section.

A A are two plates of iron or steel properly curved and fitted to the shape of the hoof upon which they are to be used. These plates meet at the front, so as to abut at the center. The front edges of the plates are made flat at $b$, and a V-shaped or dovetailed tongue, B, is formed across the front edge of each, so that the two are in an exact line when the two side plates are in position.

C is a plate or bar of iron or steel of the thickness of the shoe-plates A, and wide enough to give the required strength. This bar has a horizontal slot, D, made through it lengthwise to fit the tongue B, and it may be slipped upon the tongue so as to extend across the front of the two plates, A, to hold them firmly together.

In order to allow for the expansion of the hoof after the shoe has been nailed on, the plates A will be allowed to separate by reason of the tongues and grooves upon the front edges of the plates and the transverse bar C, so as to hold the parts firmly in place, and at the same time allow the hoof to gradually expand as it grows. While this two-part shoe acts as a rigid shoe for all purposes of a shoe or protection for the foot, it will give and allow the hoof to expand as occasion requires without losing its comparative rigidity. When toe-calks are needed they may be formed beneath the bar C in any suitable manner.

Having thus described my invention, what I claim as new, and desire to secure by Letters Patent, is—

1. In a horseshoe, the independent curved side plates, A, having the tongues B in front, in combination with the transverse bar C, having the corresponding groove or slot, substantially as herein described.

2. In a horseshoe, the independent curved side plates, A, each having a V-shaped or dovetailed tongue, B, projecting from the front, in combination with the transverse bar C, having a corresponding slot for the reception of said tongues B, substantially as and for the purpose specified.

In witness whereof I have hereunto set my hand.

PETER HICKS.

Witnesses:
S. H. NOURSE,
G. W. EMERSON.